United States Patent
Bobcik et al.

(10) Patent No.: US 12,387,689 B1
(45) Date of Patent: Aug. 12, 2025

(54) SYSTEMS AND METHODS FOR DYNAMIC DIMMING OF A SET OF DISPLAYS SHARING A SINGLE ENERGY SOURCE

(71) Applicant: GM GLOBAL TECHNOLOGY OPERATIONS LLC, Detroit, MI (US)

(72) Inventors: Lauren Schroeder Bobcik, Farmington Hills, MI (US); Matthew Blodgett, Tarboro, NC (US); Daniel Pinheiro Carlesimo, Rochester Hills, MI (US); Thiago Laserra Lima, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/780,185

(22) Filed: Jul. 22, 2024

(51) Int. Cl.
*G09G 3/34* (2006.01)
*G06F 3/01* (2006.01)
*G06F 3/14* (2006.01)

(52) U.S. Cl.
CPC .......... *G09G 3/3406* (2013.01); *G06F 3/013* (2013.01); *G06F 3/1423* (2013.01); *G09G 2360/144* (2013.01)

(58) Field of Classification Search
CPC ................. G06V 10/764; G06V 10/82; G09G 2320/0693; G09G 2340/04
See application file for complete search history.

(56) References Cited

U.S. PATENT DOCUMENTS

| | | | |
|---|---|---|---|
| 10,471,969 B1 * | 11/2019 | Laserra Lima ... | B60W 60/0053 |
| 11,742,957 B1 * | 8/2023 | Laserra Lima ...... | H04B 10/803 |
| | | | 398/140 |
| 12,096,533 B1 * | 9/2024 | Felisa ..................... | G06V 20/56 |
| 2015/0301338 A1 * | 10/2015 | Van Heugten ..... | G02B 27/0172 |
| | | | 345/8 |
| 2018/0375879 A1 * | 12/2018 | Carlesimo ........... | H04L 63/1425 |
| 2019/0020717 A1 * | 1/2019 | Carlesimo ................ | G07C 5/08 |
| 2019/0024419 A1 * | 1/2019 | Rrumbullaku .......... | E05B 81/20 |
| 2020/0043259 A1 * | 2/2020 | Carlesimo .............. | G07C 5/085 |
| 2020/0062180 A1 * | 2/2020 | Stein ...................... | B60S 1/0822 |
| 2020/0400957 A1 * | 12/2020 | Van Heugten ..... | G02B 27/0172 |
| 2021/0197724 A1 * | 7/2021 | Gu ........................ | G06V 40/171 |

(Continued)

FOREIGN PATENT DOCUMENTS

| | | |
|---|---|---|
| DE | 10256644 A1 | 6/2004 |
| DE | 102011076673 A1 | 12/2012 |
| DE | 102021111212 A1 | 11/2022 |

*Primary Examiner* — Van N Chow
(74) *Attorney, Agent, or Firm* — Ingrassia Fisher & Lorenz, LLP

(57) ABSTRACT

Systems and methods for dynamic dimming of a set of displays sharing a single energy source are provided. Image data is received from an external camera of a vehicle. A light intensity level of an external light source in the image data is determined based on the image data. A light angle of the external light source is determined with respect to the vehicle based on the image data. A desired brightness level is generated based on the light intensity level and the light angle. If a first display of a plurality of displays of the vehicle is in a line of sight of a driver gaze direction, a command is issued to adjust a brightness level of the first display to the desired brightness level and dim the other displays to a dim brightness level. The desired brightness level is greater than the dim brightness level.

20 Claims, 8 Drawing Sheets

(56) References Cited

U.S. PATENT DOCUMENTS

2022/0041133 A1\* 2/2022 Rrumbullaku .......... H04W 4/02
2023/0356655 A1\* 11/2023 Laserra Lima .......... B60Q 3/78
2025/0076064 A1\* 3/2025 Carlesimo .......... G01C 21/3476

\* cited by examiner

SYSTEMS AND METHODS FOR DYNAMIC DIMMING OF A SET OF DISPLAYS SHARING A SINGLE ENERGY SOURCE

INTRODUCTION

The technical field generally relates to vehicles, and more particularly relates to systems and methods for dynamic dimming of a set of displays sharing a single energy source.

When driving in low light conditions, the eyes of a driver of a vehicle may constantly have to adapt to changing light conditions resulting in eye strain. Factors that may contribute to eye strain include, but are not limited to, a position of the sun, headlights of oncoming vehicles, bright billboards, streetlights, and brightness levels of displays inside the vehicle. Displays inside the vehicle may provide a competing source of blue light that may pose a distraction that impacts an ability of the driver to visually focus on the road. Displays may operate in different resolutions and/or refresh rates. In addition, maintaining all of the displays in the vehicle at a constant increased brightness level may increase consumption of battery energy in electric vehicles.

Accordingly, it is desirable to provide systems and methods for dynamic dimming of a set of displays sharing a single energy source in a vehicle. Dynamically adjusting the rendering pipeline to dynamically adjust the graphics processing unit (GPU) target resolution, refresh rate and apply foveated rendering when available may result in power saving for an electric vehicle (EV) battery. Other desirable features and characteristics will become apparent from the subsequent detailed description and the appended claims, taken in conjunction with the accompanying drawings and the foregoing technical field and background.

SUMMARY

A system for dynamic dimming of a set of displays sharing a single energy source includes at least one processor and at least one memory communicatively coupled to the at least one processor. The at least one memory includes instructions that upon execution by the at least one processor, cause the at least one processor to: receive image data from at least one external camera of a vehicle; and upon a determination that the image data includes an external light source: determine a light intensity level of the external light source based on the image data; determine a light angle of the external light source with respect to the vehicle based on the image data; generate a desired brightness level based on the light intensity level and the light angle; receive driver gaze data from a gaze tracking system of the vehicle; determine a driver gaze direction based on the driver gaze data; determine whether a first display of a plurality of displays of the vehicle is in a line of sight of the driver gaze direction; and issue a first command to adjust a brightness level of the first display to the desired brightness level and dim the other displays of the plurality of displays to a dim brightness level, the desired brightness level being greater than the dim brightness level.

In at least one embodiment, the plurality of displays are associated with a default brightness level; the desired brightness level is greater than the default brightness level; and the dim brightness level is less than the default brightness level.

In at least one embodiment, the at least one memory further includes instructions that upon execution by the at least one processor, cause the at least one processor to: receive ambient light data from at least one ambient light sensor of the vehicle; determine whether the ambient light data is greater than a first ambient light threshold; upon a determination that the ambient light data is greater than the first ambient light threshold, issue a second command to adjust a hue of the first display to a day mode hue; and upon a determination that the ambient light data is less than the first ambient light threshold, issue the second command to adjust the hue of the first display to a night mode hue.

In at least one embodiment, the at least one memory further includes instructions that upon execution by the at least one processor, cause the at least one processor to: determine whether the ambient light data is less than a second ambient light threshold, the second ambient light threshold being lower than the first ambient light threshold; and issue the second command to adjust the hue of the first display to a shifted night mode hue based on the determination.

In at least one embodiment, the at least one memory further includes instructions that upon execution by the at least one processor, cause the at least one processor to: receive a driver eyesight profile; and modify at least one of the day mode hue and the night mode hue based on the driver eyesight profile.

In at least one embodiment, the at least one memory further includes instructions that upon execution by the at least one processor, cause the at least one processor to: upon a determination that none of the plurality of displays are in the line of sight of the driver gaze direction, issue a third command to adjust a brightness level of each of the plurality of displays to the dim brightness level.

In at least one embodiment, the at least one memory further includes instructions that upon execution by the at least one processor, cause the at least one processor to upon a determination that the driver gaze direction cannot be determined based on the gaze data, issue a fourth command to adjust a brightness level of each of the plurality of displays to the default brightness level.

In at least one embodiment, the at least one memory further includes instructions that upon execution by the at least one processor, cause the at least one processor to: determine whether the vehicle is on; and activate operation of the system for dynamic dimming of a set of displays sharing a single energy source based on the determination.

In at least one embodiment, the at least one memory further includes instructions that upon execution by the at least one processor, cause the at least one processor to: receive a state of charge (SOC) value of a battery system of the vehicle; determine whether the SOC value is below a SOC threshold; and activate operation of the system for dynamic dimming of the set of displays sharing the single energy source based on the determination.

In at least one embodiment, the at least one memory further includes instructions that upon execution by the at least one processor, cause the at least one processor to: identify a light source type of the external light source based on the light intensity level and the light angle; and generate the desired brightness level based on the light source type of the external light source.

In at least one embodiment, the light source type is one of a sun, headlights of a vehicle, a streetlight, and a billboard.

A method of dynamically dimming a set of displays sharing a single energy source includes: receiving image data from at least one external camera of a vehicle; and upon a determination that the image data includes an external light source: determining a light intensity level of the external light source based on the ambient light data; determining a light angle of the external light source with respect to the vehicle based on the image data; generating a desired brightness level based on the light intensity level and the light angle; receiving driver gaze data from a gaze tracking system of the vehicle; determining a driver gaze direction based on the driver gaze data; determining whether a first display of a plurality of displays of the vehicle is in a line of sight of the driver gaze direction; and issuing a first command to adjust a brightness level of the first display to the desired brightness level and dim the other displays of the plurality of displays to a dim brightness level, the desired brightness level being greater than the dim brightness level.

In at least one embodiment, the plurality of displays are associated with a default brightness level; the desired brightness level is greater than the default brightness level; and the dim brightness level is less than the default brightness level.

In at least one embodiment, the method further includes: receiving ambient light data from at least one ambient light sensor of the vehicle; determining whether the ambient light data is greater than a first ambient light threshold; upon a determination that the ambient light data is greater than the first ambient light threshold, issuing a second command to adjust a hue of the first display to a day mode hue; and upon a determination that the ambient light data is less than the first ambient light threshold, issuing the second command to adjust the hue of the first display to a night mode hue.

In at least one embodiment, the method further includes: determining whether the ambient light data is less than a second ambient light threshold, the second ambient light threshold being lower than the first ambient light threshold; and issuing the second command to adjust the hue of the first display to a shifted night mode hue based on the determination.

In at least one embodiment, the method further includes: upon a determination that none of the plurality of displays are in the line of sight of the driver gaze direction, issuing a third command to adjust a brightness level of each of the plurality of displays to the dim brightness level.

In at least one embodiment, the method further includes: upon a determination that the driver gaze direction cannot be determined based on the gaze data, issuing a fourth command to adjust a brightness level of each of the plurality of displays to the default brightness level.

In at least one embodiment, the method further includes: identifying a light source type of the external light source based on the light intensity level and the light angle; and generating the desired brightness level based on the light source type of the external light source.

In at least one embodiment, the method further includes: locking a driver eye gaze; determining an eye gaze zone, the eye gaze zone being one of a front zone, a left zone, a right zone, and undefined zone, the front zone being associated with road attention; and determining whether the eye gaze is on a road based on the determined eye gaze zone; upon a determination that the eye gaze is on the road; and update a power mode zone; update information to the road attention; and determine whether a passenger is detected; upon a determination that the passenger is detected: update the power mode zone; update the information to interior attention by the passenger and an interface to act as a wakeup event; place passenger displays in a normal operating mode; place passenger door switches in a regular pooling rate; and exit passenger side modules from a pseudo sleep; and upon a determination that the passenger is not detected: passenger displays are able to change power modes, lower refresh rate, and lower resolution; change the pooling rate of the passenger door switches; reduce a network bandwidth of the passenger side modules; and enter the passenger side modules into the pseudo sleep; and upon a determination that the eye gaze is not on the road: update the power mode zone; and update the information to interior attention; place the passenger displays in the normal operating mode; place the passenger door switches in the regular pooling rate; and exit the passenger side modules from the pseudo sleep.

A vehicle including a system for dynamic dimming of a set of displays sharing a single energy source includes at least one external camera; at least one processor communicatively coupled to the at least one external camera; and at least one memory communicatively coupled to the at least one processor. The at least one memory includes instructions that upon execution by the at least one processor, cause the at least one processor to: receive image data from the at least one external camera; and upon a determination that the image data includes an external light source: determine a light intensity level of the external light source based on the image data; determine a light angle of the external light source with respect to the vehicle based on the image data; generate a desired brightness level based on the light intensity level and the light angle; receive driver gaze data from a gaze tracking system of the vehicle; determine a driver gaze direction based on the driver gaze data; determine whether a first display of a plurality of displays of the vehicle is in a line of sight of the driver gaze direction; and issue a first command to adjust a brightness level of the first display to the desired brightness level and dim the other displays of the plurality of displays to a dim brightness level, the desired brightness level being greater than the dim brightness level.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
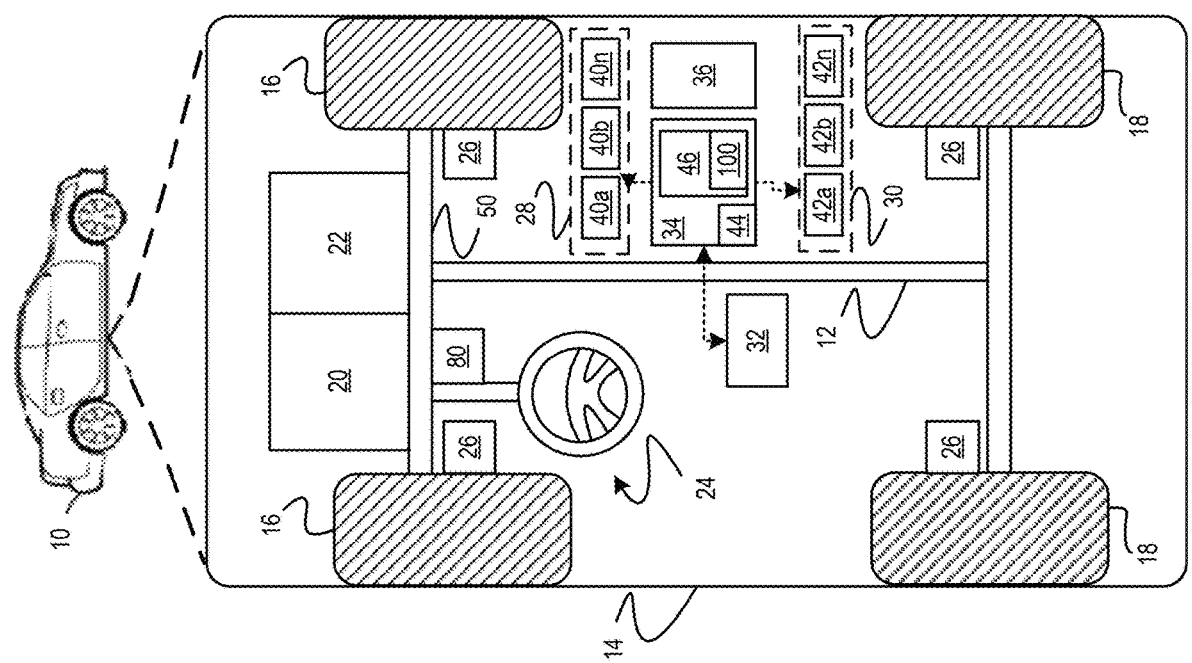
FIG. 1 is a functional block diagram of a vehicle including a system for dynamic dimming of a set of displays sharing a single energy source in accordance with at least one embodiment.

Referring to FIG. 1, a functional block diagram of a vehicle including a system for dynamic dimming of a set of displays sharing a single energy source 100 in accordance with at least one embodiment is shown. In at least one embodiment, the single energy source refers to a collection of battery units or all of the energy sources used to power an electric vehicle (EV) 10. In at least one embodiment, the set of displays refers to a plurality of displays in the vehicle 10. In at least one embodiment, the set of displays refers to all of the displays in the vehicle 10. The vehicle 10 generally includes a chassis 12, a body 14, front wheels 16, and rear wheels 18. While the vehicle 10 is depicted in the illustrated embodiment as a passenger car, the vehicle 10 may be other types of vehicles including trucks, sport utility vehicles (SUVs), and recreational vehicles (RVs).

In various embodiments, the body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an automated driving system (ADS). The propulsion system 20 is configured to generate power to propel the vehicle. The propulsion system 20 may, in various embodiments, include an internal combustion engine, an electric machine such as a traction motor, a fuel cell propulsion system, and/or any other type of propulsion configuration. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16-18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, a steering wheel sensor, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16-18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate. In at least one embodiment, the vehicle dynamic sensors provide vehicle movement data.

The actuator system 30 includes one or more actuator devices 42*a*-42*n* that control one or more vehicle features such as, but not limited to, one or more vehicle wheels 16-18 the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADS.

Figure 2:
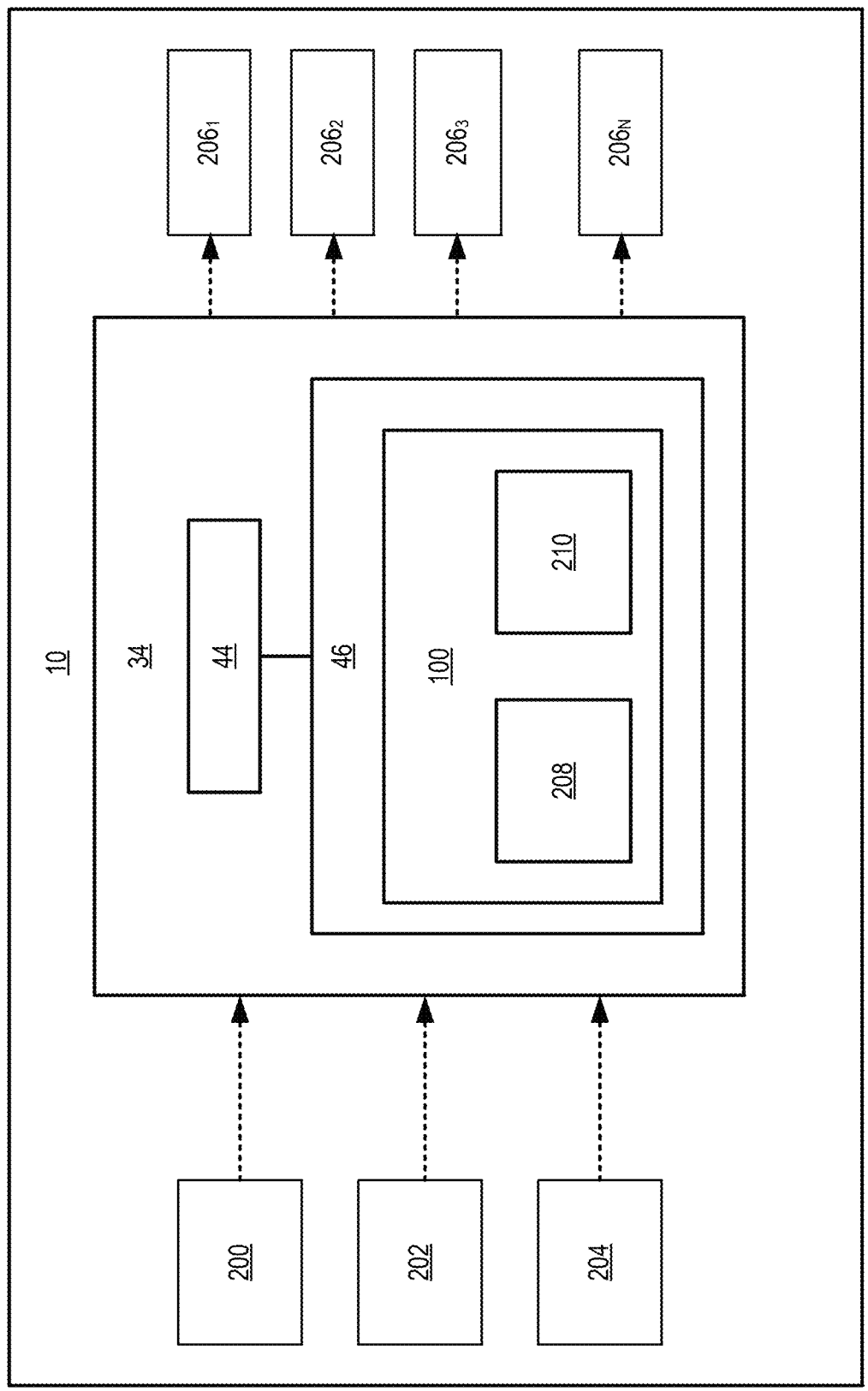
FIG. 2 is a functional block diagram of a system for dynamic dimming of a set of displays sharing a single energy source in accordance with at least one embodiment.

Referring to FIG. 2, a functional block diagram of a controller 34 including a system for dynamic dimming of a set of displays sharing a single energy source 100 in accordance with at least one embodiment is shown. The controller 34 includes at least one processor 44 and at least one memory 46. The at least one processor 44 is a programmable device that includes one or more instructions stored in or associated with the at least one memory 46. The at least one memory 46 includes instructions that the at least one processor 44 is configured to execute. The at least one memory 46 includes an embodiment of the system for dynamic dimming of a set of displays sharing a single energy source 100. The controller 34 is configured to be communicatively coupled to at least one ambient light sensor 200, at least one external camera 202, a gaze tracking system 204, and a plurality of displays 2061, 2062, 2063, 206N. The plurality of displays 2061, 2062, 2063, 206N may operate in different resolutions and/or refresh rates.

The ambient light sensor(s) 200 is configured to generate the ambient light data based on sensed ambient light around the vehicle 10. The external camera(s) 202 are configured to capture images of an external environment outside of the vehicle 10. In at least one embodiment, the external camera(s) 202 is mounted on a windshield of the vehicle 10. In at least one embodiment, the external camera(s) 202 is mounted on a dashboard of the vehicle 10. In at least one embodiment, the external camera(s) 202 is mounted on a hood of the vehicle 10. In at least one embodiment, the gaze tracking system 204 includes at least one internal camera. The internal camera(s) is configured to capture images of a driver in an interior of the vehicle 10. The plurality of displays 2061, 2062, 2063, 206N may also be referred to as a plurality of display devices 2061, 2062, 2063, 206N. Each of the plurality of displays 2061, 2062, 2063, 206N is configured to receive commands from the system for dynamic dimming of a set of displays sharing a single energy source 100 and responsively adjust a brightness level and/or hue of the displays 2061, 2062, 2063, 206N.

In at least one embodiment, the system for dynamic dimming of a set of displays sharing a single energy source 100 includes a light capture algorithm 208 and a light dimming algorithm 210. The controller 34 may include additional components that facilitate operation of the system for dynamic dimming of a set of displays sharing a single energy source 100. The operation of the system for dynamic dimming of a set of displays sharing a single energy source 100 will be described in greater detail below.

Figure 3:
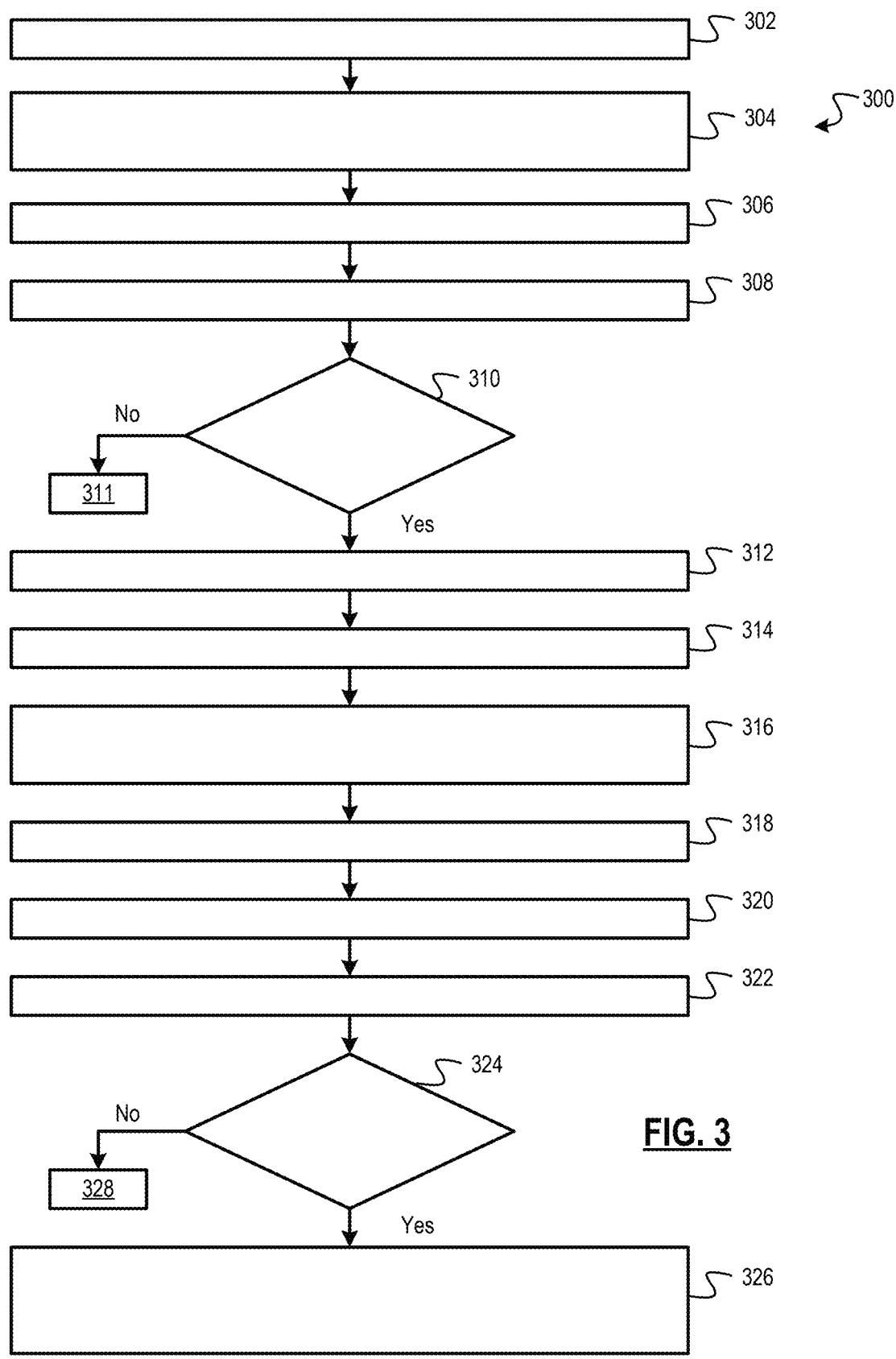
FIG. 3 is a flowchart representation of an exemplary method of dynamically dimming a set of displays sharing a single energy source in accordance with at least one embodiment.

Referring to FIG. 3, a flowchart representation of an exemplary method 300 method of dynamically dimming a set of displays sharing a single energy source in a vehicle 10 in accordance with at least one embodiment is shown. The method 300 will be described with reference to an exemplary implementation of an embodiment of a system for dynamic dimming of a set of displays sharing a single energy source 100. As can be appreciated in light of the disclosure, the order of operation within the method 300 is not limited to the sequential execution as illustrated in FIG. 3 but may be performed in one or more varying orders as applicable and in accordance with the present disclosure.

At 302, the vehicle 10 is turned on. At 304 operation of the system for dynamic dimming of a set of displays sharing a single energy source 100 is activated. In at least one embodiment, the operation of the system for dynamic dimming of a set of displays sharing a single energy source 100 is activated in response to the vehicle 10 being turned on. In at least one embodiment, the operation of the system for dynamic dimming of a set of displays sharing a single energy source 100 receives a state of charge (SOC) value of a battery system of the vehicle 10. The system for dynamic dimming of a set of displays sharing a single energy source 100 determines whether the SOC value is below a SOC threshold. An SOC value that is below the SOC threshold indicates that the battery system has a low SOC and the system for dynamic dimming of a set of displays sharing a single energy source 100 is responsively activated to conserve battery system power.

At 306, the system for dynamic dimming of a set of displays sharing a single energy source 100 receives ambient light data from the ambient light sensor(s) 200 of the vehicle 10. In at least one embodiment, the light capture algorithm 208 receives the ambient light data from the ambient light sensor(s) 200 of the vehicle 10. The ambient light sensor(s) 200 is configured to generate the ambient light data based on sensed ambient light around the vehicle 10.

At 308, the system for dynamic dimming of a set of displays sharing a single energy source 100 receives image data from an external camera(s) 202 of the vehicle 10. In at least one embodiment, the light capture algorithm 208 receives the image data from the external camera(s) 202 of the vehicle 10. In at least one embodiment, the external camera(s) 202 is mounted on a windshield of the vehicle 10. In at least one embodiment, the external camera(s) 202 is mounted on a dashboard of the vehicle 10. In at least one embodiment, the external camera(s) 202 is mounted on a hood of the vehicle 10.

At 310, the system for dynamic dimming of a set of displays sharing a single energy source 100 determines whether the image data includes an external light source. In at least one embodiment, the light capture algorithm 208 determines whether the image data includes an external light source. Examples of external light sources include, but are not limited to, a sun, a billboard, a streetlight, and headlights of a vehicle.

In at least one embodiment, the light capture algorithm 208 is a machine learning model. A remote cloud-based system trains the light capture algorithm 208 to recognize external light sources in image data using datasets. Crowd sourced image data and identified external light sources in the image data are received from the system for dynamic dimming of a set of displays sharing a single energy source 100 of different vehicles 10 at the remote cloud-based system. The remote cloud-based system uses the crowd sourced image data and identified external light sources in the image data to train and refine the light capture algorithm 208. Updates to the light capture algorithm 208 based on the training and refinement are transmitted from the remote cloud-based system to the light capture algorithm 208 of the vehicle 10.

If the system for dynamic dimming of a set of displays sharing a single energy source 100 determines that the image data does not include an external light source, the system for dynamic dimming of a set of displays sharing a single energy source 100 issues a command to the plurality of displays 2061, 2062, 2063, 206N of the vehicle 10 to adjust the brightness level of the plurality of displays 2061, 2062, 2063, 206N to a default brightness level at 311.

If the system for dynamic dimming of a set of displays sharing a single energy source 100 determines that the image data includes an external light source, the system for dynamic dimming of a set of displays sharing a single energy source 100 determines a light intensity level of the external light source based on the image data at 312. In at least one embodiment, the light capture algorithm 208 determines the light intensity level of the external light source based on the image data.

In at least one embodiment, the light capture algorithm 208 is a machine learning model. A remote cloud-based system trains the light capture algorithm 208 to determine light intensities of external light sources using datasets. Crowd sourced external light sources, ambient light levels, and associated light intensity levels are received from the system for dynamic dimming of a set of displays sharing a single energy source 100 of different vehicles 10 at the remote cloud-based system. The remote cloud-based system uses the crowd sourced external light sources, ambient light levels, and associated light intensity levels to train and refine the light capture algorithm 208. Updates to the light capture algorithm 208 based on the training and refinement are transmitted from the remote cloud-based system to the light capture algorithm 208 of the vehicle 10.

At 314, the system for dynamic dimming of a set of displays sharing a single energy source 100 determines a light angle of the external light source with respect to the vehicle 10 based on the image data. In at least one embodiment, the light capture algorithm 208 determines the light angle of the external light source with respect to the vehicle 10 based on the image data.

In at least one embodiment, the light capture algorithm 208 is a machine learning model. A remote cloud-based system trains the light capture algorithm 208 to determine light angles of external light sources with respect to vehicles using datasets based on image data. Crowd sourced image data, external light sources and associated light angles are received from the systems for dynamic dimming of a set of displays sharing a single energy source 100 of different vehicles 10 at the remote cloud-based system. The remote cloud-based system uses the crowd sourced external light sources and associated light intensity levels to train and refine the light capture algorithm 208. Updates to the light capture algorithm 208 based on the training and refinement are transmitted from the remote cloud-based system to the light capture algorithm 208 of the vehicle 10.

At 316, the system for dynamic dimming of a set of displays sharing a single energy source 100 generates a desired brightness level based on the light intensity level and the light angle of the external light source. In at least one embodiment, the light dimming algorithm 210 generates the desired brightness level based on the light intensity level and the light angle of the external light source. The vehicle 10 includes a plurality of displays 2061, 2062, 2063, 206N. Each of the displays 2061, 2062, 2063, 206N is associated with a default brightness level. The desired brightness level is greater than the default brightness level.

At 318, the system for dynamic dimming of a set of displays sharing a single energy source 100 generates a hue adjustment based on the ambient light data. In at least one embodiment, the light dimming algorithm 210 generates the hue adjustment based on the ambient light data. In at least one embodiment, the light dimming algorithm 210 determines whether the ambient light data is greater than a day mode ambient light threshold. If the light dimming algorithm 210 determines that the ambient light data is greater than the day mode ambient light threshold, the light dimming algorithm 210 generates a day mode hue as the hue adjustment. Specific hues are employed in the presentation of graphics in a display 2061, 2062, 2063, 206N in a day mode hue. The hues used in the day mode hue are selected to enhance visual perception of the graphics, for example, in broad daylight when ambient light levels are relatively high and there is a lower likelihood of eye strain.

If the light dimming algorithm 210 determines that the ambient light data is less than the day mode ambient light threshold, the light dimming algorithm 210 determines whether the ambient light data is less than a dark sky ambient light threshold. If the light dimming algorithm 210 determines that the ambient light data is greater than the dark sky ambient light threshold, the light dimming algorithm 210 generates a night mode hue as the hue adjustment. Specific hues are employed in the presentation of graphics in a display 2061, 2062, 2063, 206N in a night mode hue. The hues used in the night mode hue are selected to enhance visual perception of graphics using mesopic vision, for example, during dusk or dawn when ambient light levels are moderately low.

If the light dimming algorithm 210 determines that the ambient light data is less than the dark sky ambient light threshold, the light dimming algorithm 210 generates a shifted night mode hue as the hue adjustment. In very low light situations, such as for example in protected dark sky environments (e.g. the presence of light is minimal), red hues are often employed in the shifted night mode hue presentation of graphics in a display 2061, 2062, 2063, 206N. The red hues are often used in the shifted night mode hue to enhance visual perception of the graphics when the rods in the human eye are primarily used in vision and may reduce eye strain.

At 320, the system for dynamic dimming of a set of displays sharing a single energy source 100 receives driver gaze data from a gaze tracking system 204 of the vehicle 10. In at least one embodiment, the gaze tracking system 204 includes one or more internal cameras configured to capture images of a head of a driver of the vehicle 10. The gaze data includes the images captured by the internal camera(s). At 322, the system for dynamic dimming of a set of displays sharing a single energy source 100 determines a driver gaze direction of the driver of the vehicle 10 based on the gaze data.

At 324, the system for dynamic dimming of a set of displays sharing a single energy source 100 determines whether one of the plurality of displays 2061, 2062, 2063, 206N of the vehicle 10 is in a line of sight of the driver gaze direction. If the system for dynamic dimming of a set of displays sharing a single energy source 100 determines that one of the plurality of displays 2061 of the vehicle 10 is in the line of sight of the driver gaze direction, the method 300 proceeds to 326. At 326, the system for dynamic dimming of a set of displays sharing a single energy source 100 issues a command to the display 2061 in the line of sight of the driver gaze direction to adjust the brightness level of the display 2061 to the desired brightness level and implement the hue adjustment. The system for dynamic dimming of a set of displays sharing a single energy source 100 issues a command to the other displays 2062, 2063, 206N of the vehicle 10 to adjust the brightness level to a dim brightness level.

As mentioned above each of the displays 2061, 2062, 2063, 206N is associated with a default brightness level. The desired brightness level is greater than the default brightness level. The dim brightness level is less than the default brightness level. Placing the displays 2062, 2063, 206N of the vehicle 10 that are not in the line of sight of the driver gaze direction in the dim brightness level results in reduced energy usage of the battery system of the vehicle 10.

If the system for dynamic dimming of a set of displays sharing a single energy source 100 determines that none of the plurality of displays 2061, 2062, 2063, 206N of the vehicle 10 are in the line of sight of the driver gaze direction, the method 300 proceeds to 328. At 328, the system for dynamic dimming of a set of displays sharing a single energy source 100 issues a command to the plurality of displays 2061, 2062, 2063, 206N to adjust the brightness level of the all of displays 2061, 2062, 2063, 206N in the vehicle 10 to the dim brightness level. Since none of the displays 2061, 2062, 2063, 206N of the vehicle 10 are in the line of sight of the driver gaze direction, placing all of the displays 2061, 2062, 2063, 206N of the vehicle 10 in the dim brightness level results in reduced energy usage of the battery system of the vehicle 10.

In at least one embodiment, if the system for dynamic dimming of a set of displays sharing a single energy source 100 is unable to determine a driver gaze direction based on the gaze data received from the gaze tracking system 204, the system for dynamic dimming of a set of displays sharing a single energy source 100 is configured to issue a command to the plurality of displays 2061, 2062, 2063, 206N to adjust the brightness level of the all of displays 2061, 2062, 2063, 206N in the vehicle 10 to the default brightness level.

In at least one embodiment, the system for dynamic dimming of a set of displays sharing a single energy source 100 is configured to receive a driver eyesight profile via a user input device of the vehicle 10. The system for dynamic dimming of a set of displays sharing a single energy source 100 modifies at least one of the day mode hue, the night mode hue, and the shifted night mode hue based on the driver profile. If for example, the driver eyesight profile indicates that a driver of the vehicle 10 is color blind, the system for dynamic dimming of a set of displays sharing a single energy source 100 modifies at least one of the day mode hue, the night mode hue, and the shifted night mode hue to eliminate the use of colors that the driver is unable to see.

In at least one embodiment, the system for dynamic dimming of a set of displays sharing a single energy source 100 identifies a light source type of external light source in the image data received from the external camera(s) 202 based on the light intensity level and the light angle. In at least one embodiment, the light capture algorithm 208 identifies the light source type of external light source in image data received from the external camera(s) 202 based on the light intensity level and the light angle. Examples of light source types include, but are not limited to, a sun, headlights of a vehicle, a streetlight, and a billboard. The system for dynamic dimming of a set of displays sharing a single energy source 100 determines the desired brightness level based on the light source type of the external light source. In at least one embodiment, the light dimming algorithm 210 determines the desired brightness level based on the light source type of the external light source.

Figure 4:
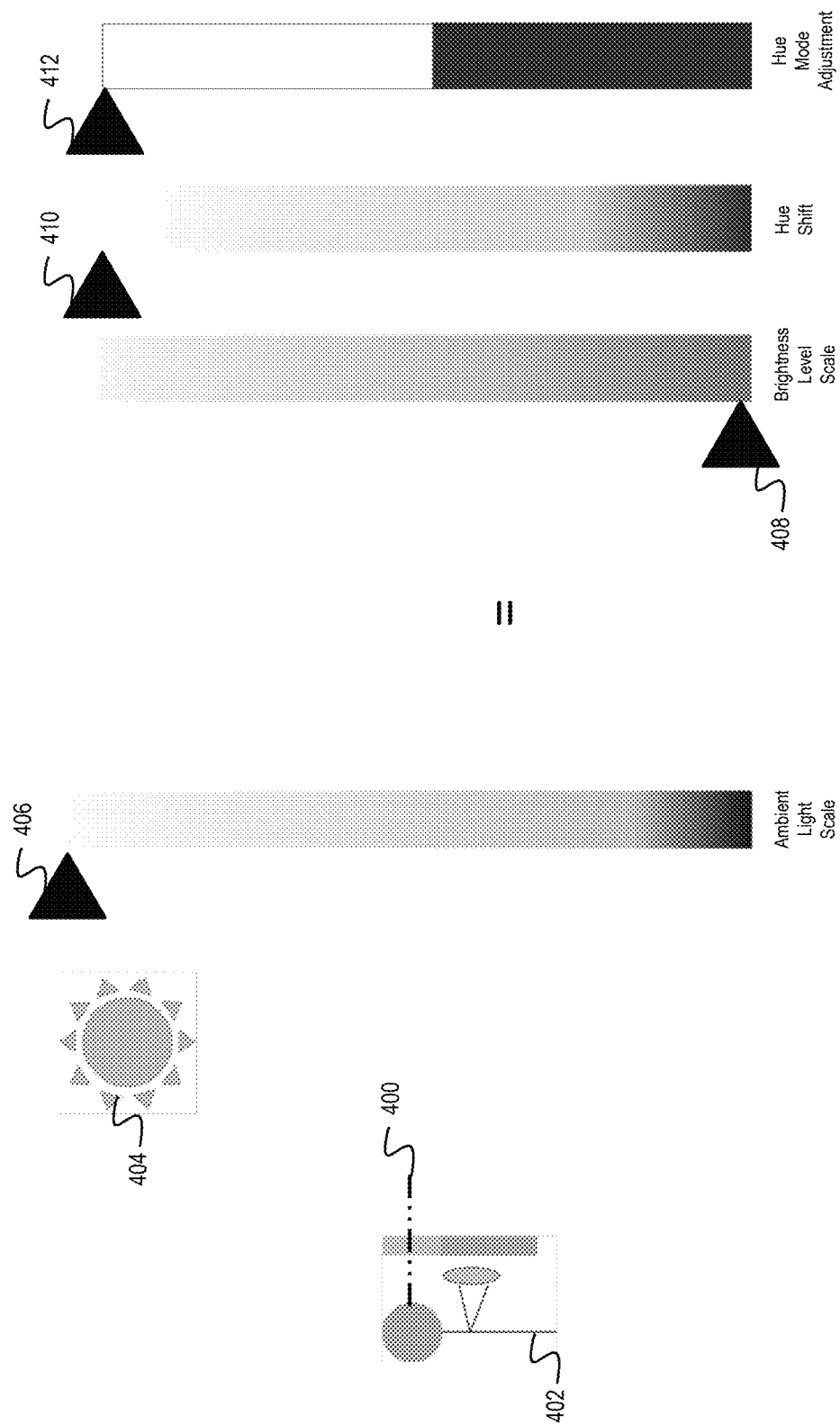
FIG. 4 is a diagrammatic representation of an exemplary implementation of a system for dynamic dimming of a set of displays sharing a single energy source in broad daylight with none of a plurality of displays of a vehicle in a line of sight of a driver gaze direction of a driver in accordance with at least one embodiment.

Referring to FIG. 4, a diagrammatic representation of an exemplary implementation of a system for dynamic dimming of a set of displays sharing a single energy source 100 in broad daylight with none of a plurality of displays 2061, 2062, 2063, 206N of a vehicle 10 in a line of sight of a driver gaze direction 400 of a driver 402 in accordance with at least one embodiment is shown. The system for dynamic dimming of a set of displays sharing a single energy source 100 received ambient light data and image data. The image data included an external light source. The external light source is the sun 404.

The system for dynamic dimming of a set of displays sharing a single energy source 100 determined a light intensity level 406 based on the ambient light data. The light intensity level 406 is at the high end of the ambient light scale. The driver gaze direction 400 of the driver 402 is directly ahead. The system for dynamic dimming of a set of displays sharing a single energy source 100 determined that the none of the plurality of displays 2061, 2062, 2063, 206N in the vehicle 10 were in the light of sight of the driver gaze direction 400. Accordingly, the system for dynamic dimming of a set of displays sharing a single energy source 100 issued a command to adjust the brightness level of the plurality of displays 2061, 2062, 2063, 206N in the vehicle 10 to a dim brightness level 408 as indicated in the brightness level scale.

The system for dynamic dimming of a set of displays sharing a single energy source 100 determined that the ambient light data was greater than a day mode ambient light data threshold and generated a day mode hue 412 adjustment to the plurality of displays 2061, 2062, 2063, 206N in the vehicle 10. The system for dynamic dimming of a set of displays sharing a single energy source 100 determined that there was no need to implement a hue shift 410 to the day mode hue 412.

Figure 5:
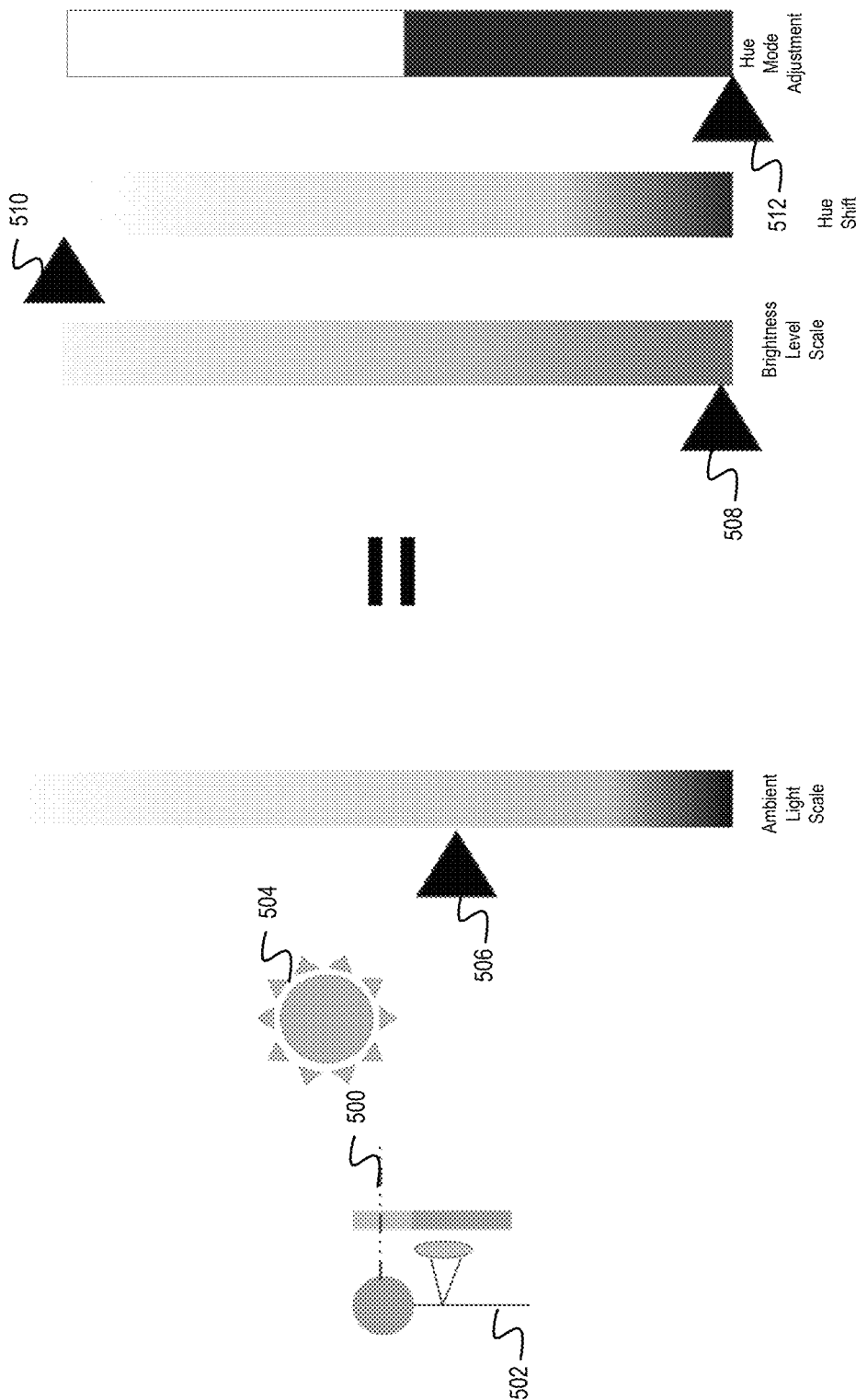
FIG. 5 is a diagrammatic representation of an exemplary implementation of a system for dynamic dimming of a set of displays sharing a single energy source in dusk or dawn with none of a plurality of displays of a vehicle in a line of sight of a driver gaze direction of a driver in accordance with at least one embodiment.

Referring to FIG. 5, a diagrammatic representation of an exemplary implementation of a system for dynamic dimming of a set of displays sharing a single energy source 100 in dusk or dawn with none of a plurality of displays 2061, 2062, 2063, 206N of a vehicle 10 in a line of sight of a driver gaze direction 500 of a driver 502 in accordance with at least one embodiment is shown. The system for dynamic dimming of a set of displays sharing a single energy source 100 received ambient light data and image data. The image data included an external light source. The external light source is the sun 504.

The system for dynamic dimming of a set of displays sharing a single energy source 100 determined a light intensity level 506 based on the ambient light data. The light intensity level 506 is in the middle of the ambient light scale indicating a moderate light intensity level 506. The driver gaze direction 500 of the driver 502 is directly ahead. The system for dynamic dimming of a set of displays sharing a single energy source 100 determined that the none of the plurality of displays 2061, 2062, 2063, 206N in the vehicle 10 were in the light of sight of the driver gaze direction 500. Accordingly, the system for dynamic dimming of a set of displays sharing a single energy source 100 issued a command to adjust the brightness level of the plurality of displays 2061, 2062, 2063, 206N in the vehicle 10 to a dim brightness level 508 as indicated in the brightness level scale.

The system for dynamic dimming of a set of displays sharing a single energy source 100 determined that the ambient light data was less than a day mode ambient light data threshold and greater than dark sky ambient light threshold. Accordingly, the system for dynamic dimming of a set of displays sharing a single energy source 100 generated a night mode hue 512 adjustment to the plurality of displays 2061, 2062, 2063, 206N in the vehicle 10. The system for dynamic dimming of a set of displays sharing a single energy source 100 determined that there was no need to implement a hue shift 510 to the night mode hue 512 since the ambient light data was greater than the dark sky ambient light threshold.

Figure 6:
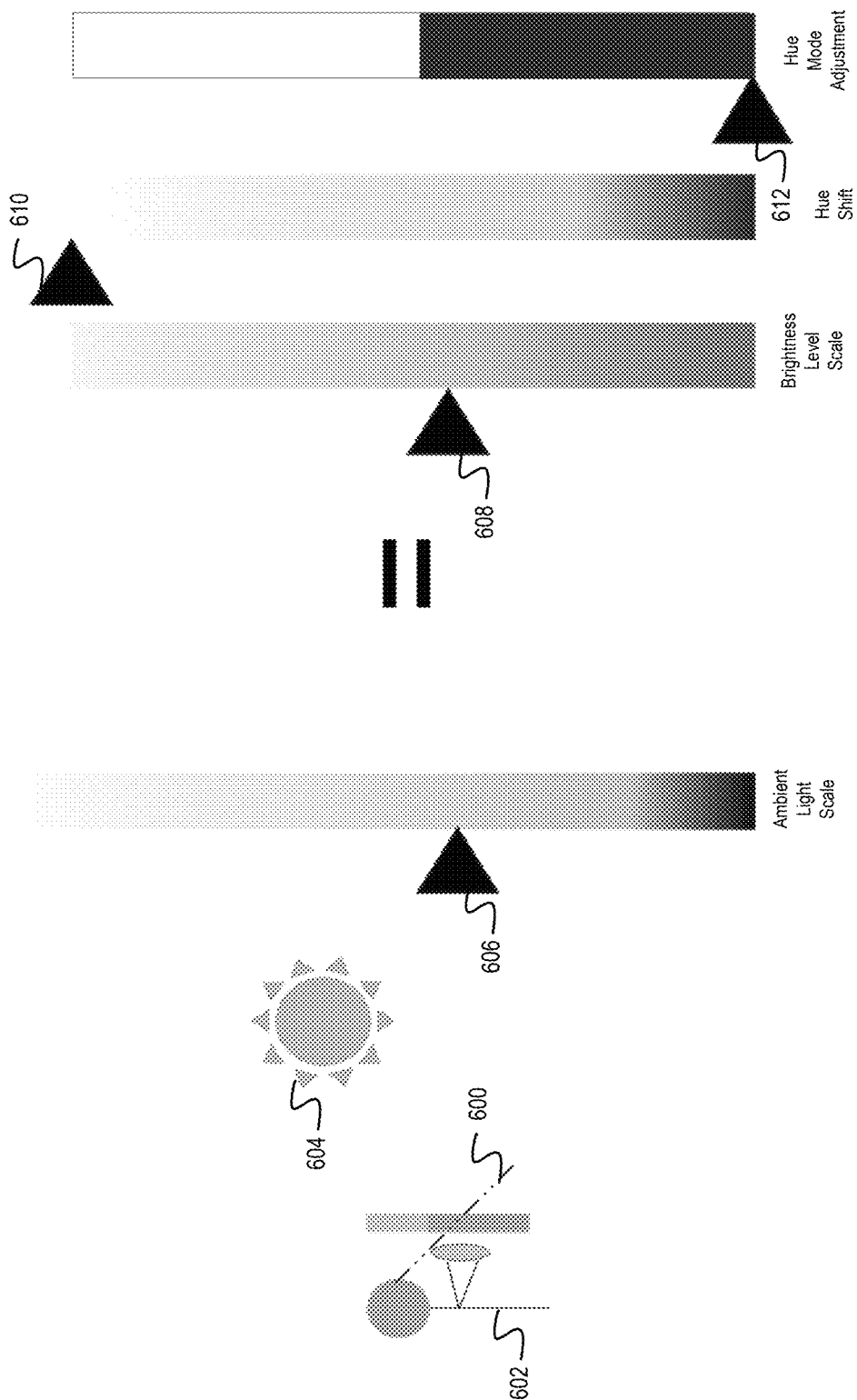
FIG. 6 is a diagrammatic representation of an exemplary implementation of a system for dynamic dimming of a set of displays sharing a single energy source in dusk or dawn with one of the plurality of displays of a vehicle in a line of sight of a driver gaze direction of a driver in accordance with at least one embodiment.

Referring to FIG. 6, a diagrammatic representation of an exemplary implementation of a system for dynamic dimming of a set of displays sharing a single energy source 100 in dusk or dawn with one of the plurality of displays of a vehicle 10 in a line of sight of a driver gaze direction 600 of a driver 602 in accordance with at least one embodiment is shown. The system for dynamic dimming of a set of displays sharing a single energy source 100 received ambient light data and image data. The image data included an external light source. The external light source is the sun 604. The system for dynamic dimming of a set of displays sharing a single energy source 100 determined a light intensity level 606 based on the ambient light data. The light intensity level 606 is in the middle of the ambient light scale indicating a moderate light intensity level 606.

The driver gaze direction 600 of the driver 602 is toward one of the of the plurality of displays 2061 in the vehicle 10. The system for dynamic dimming of a set of displays sharing a single energy source 100 determined a light angle of the sun 604 with respect to the vehicle 10 and generated a desired brightness level 608 based on the light intensity level 606 and the light angle.

The system for dynamic dimming of a set of displays sharing a single energy source 100 determined that the ambient light data was less than a day mode ambient light data threshold and greater than dark sky ambient light threshold. Accordingly, the system for dynamic dimming of a set of displays sharing a single energy source 100 generated a night mode hue 612 adjustment to the plurality of displays 2061, 2062, 2063, 206N in the vehicle 10. The system for dynamic dimming of a set of displays sharing a single energy source 100 determined that there was no need to implement a hue shift 610 to the night mode hue 612 since the ambient light data was greater than the dark sky ambient light threshold.

The system for dynamic dimming of a set of displays sharing a single energy source 100 issued a command to the display 2061 in the line sight of the gaze direction 600 of the driver 602 to adjust the brightness level of the display 2061 to the desired brightness level 608 and implement the night mode hue adjustment. The system for dynamic dimming of a set of displays sharing a single energy source 100 issued a command to the other displays 2062, 2063, 206N in the vehicle 10 to a dim the brightness level of the displays 2062, 2063, 206N to a dim brightness level and implement the night hue mode adjustment.

Figure 7:
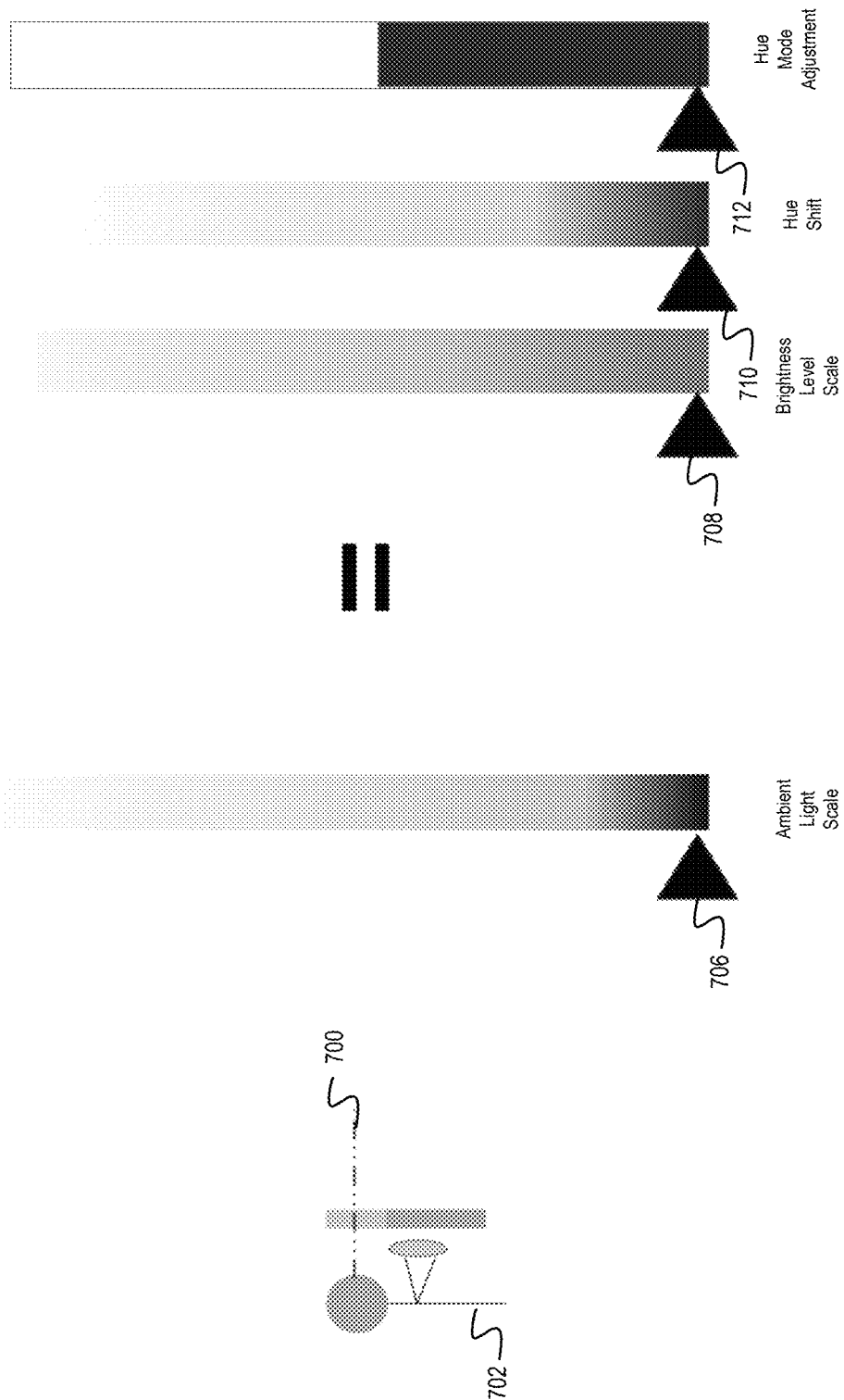
FIG. 7 is a diagrammatic representation of an exemplary implementation of a system for dynamic dimming of a set of displays sharing a single energy source in a protected dark sky area with none of a plurality of displays of a vehicle in a line of sight of a driver gaze direction of a driver in accordance with at least one embodiment.

Referring to FIG. 7, a diagrammatic representation of an exemplary implementation of a system for dynamic dimming of a set of displays sharing a single energy source 100 in a protected dark sky area with none of a plurality of displays 2061, 2062, 2063, 206N of a vehicle 10 in a line of sight of a driver gaze direction 700 of a driver 702 in accordance with at least one embodiment is shown. The system for dynamic dimming of a set of displays sharing a single energy source 100 received ambient light data and image data.

The system for dynamic dimming of a set of displays sharing a single energy source 100 determined a light intensity level 706 based on the ambient light data. The light intensity level 706 is at the low end of the ambient light scale indicating a very low light intensity level 706. The driver gaze direction 700 of the driver 702 is directly ahead. The system for dynamic dimming of a set of displays sharing a single energy source 100 determined that the none of the plurality of displays 2061, 2062, 2063, 206N in the vehicle 10 were in the light of sight of the driver gaze direction 700. Accordingly, the system for dynamic dimming of a set of displays sharing a single energy source 100 issued a command to adjust the brightness level of the plurality of displays 2061, 2062, 2063, 206N in the vehicle 10 to a dim brightness level 708 as indicated in the brightness level scale.

The system for dynamic dimming of a set of displays sharing a single energy source 100 determined that the ambient light data was less than a day mode ambient light data threshold and less than dark sky ambient light threshold. Accordingly, the system for dynamic dimming of a set of displays sharing a single energy source 100 generated a night mode hue 712 adjustment to the plurality of displays 2061, 2062, 2063, 206N in the vehicle 10. The system for dynamic dimming of a set of displays sharing a single energy source 100 implemented a hue shift 710 to the night mode hue 712 to generate a shifted night mode hue since the ambient light data was less than the dark sky ambient light threshold.

In at least one embodiment, the gaze tracking, light sensors, cameras, and computer vision are incorporated into a system of algorithms to dynamically shift the brightness, hue, resolution (by applying foveating rendering) and/or refresh rate of an in-vehicle display to support the driver's visual focus in low light (mesopic vision) conditions and dim the display when not in use by the driver or scale display refresh rate and resolution when attention is not a the display.

Combining driver gaze with current luminance and camera data, an algorithm can compute how to adjust the display brightness, hue, resolution and/or refresh rate to preserve EV battery life and support the driver's focus in real time, reducing disability and discomfort glare. Machine learning will be used to train the external cameras' computer vision to accurately identify light sources and intensity, which will improve recognition over time.

Software algorithms are used to dynamically shift the brightness, hue, resolution, and/or refresh rate of individual in-vehicle displays to support driver's visual focus and preserve EV battery.

In at least one embodiment, when the vehicle is on, the driver gaze tracking will enable some additional display and system behavior changes. If gaze tracking identifies where the driver is looking, that information will be sent to the dynamic resolution engine, foveated rendering engine, and dynamic refresh rate display engine. The resolution and refresh rate engine will determine the optimal vehicle display resolution, refresh rate and foveated rendering targets, Then the resulting configurations will be sent to the GPU cluster (display module) which will then adjust the aforementioned parameters to all affected displays in the driver's visual range. Modules to dynamically change power modes by shifting switches pooling rate, CPU power states and network speed shift to lower speeds. Foveated and dynamic resolution rendering will be established by a predetermination of an eye gaze zone, in with when the gaze enters on this zone a part of the display will enter in a reduced resolution or the full display will be allowed to shift to a lower resolution mode depending on system capability and eye gaze zone data. Refresh rate rendering will be established by a pre-determined zone, of when the eye gaze enters it the rendering pipeline will adjust the refresh rate. For modules outside the main eye gaze attention zone, the system will enable a dynamic pooling rate change for input outputs (I/O's), central processing unit (CPU) clock and when available network speed change. In an event that the driver gaze tracking is not available, the system will return it to its optimal state in with full resolution, refresh rate. Or in an event that a passenger is present, and no gaze tracking is available for the passenger, the system shall return to its optimal logic. The outputs of the rendering and refresh rate engines will be stored in an external/cloud-based database to identify patterns over time and improve the accuracy of the algorithms.

Figure 8:
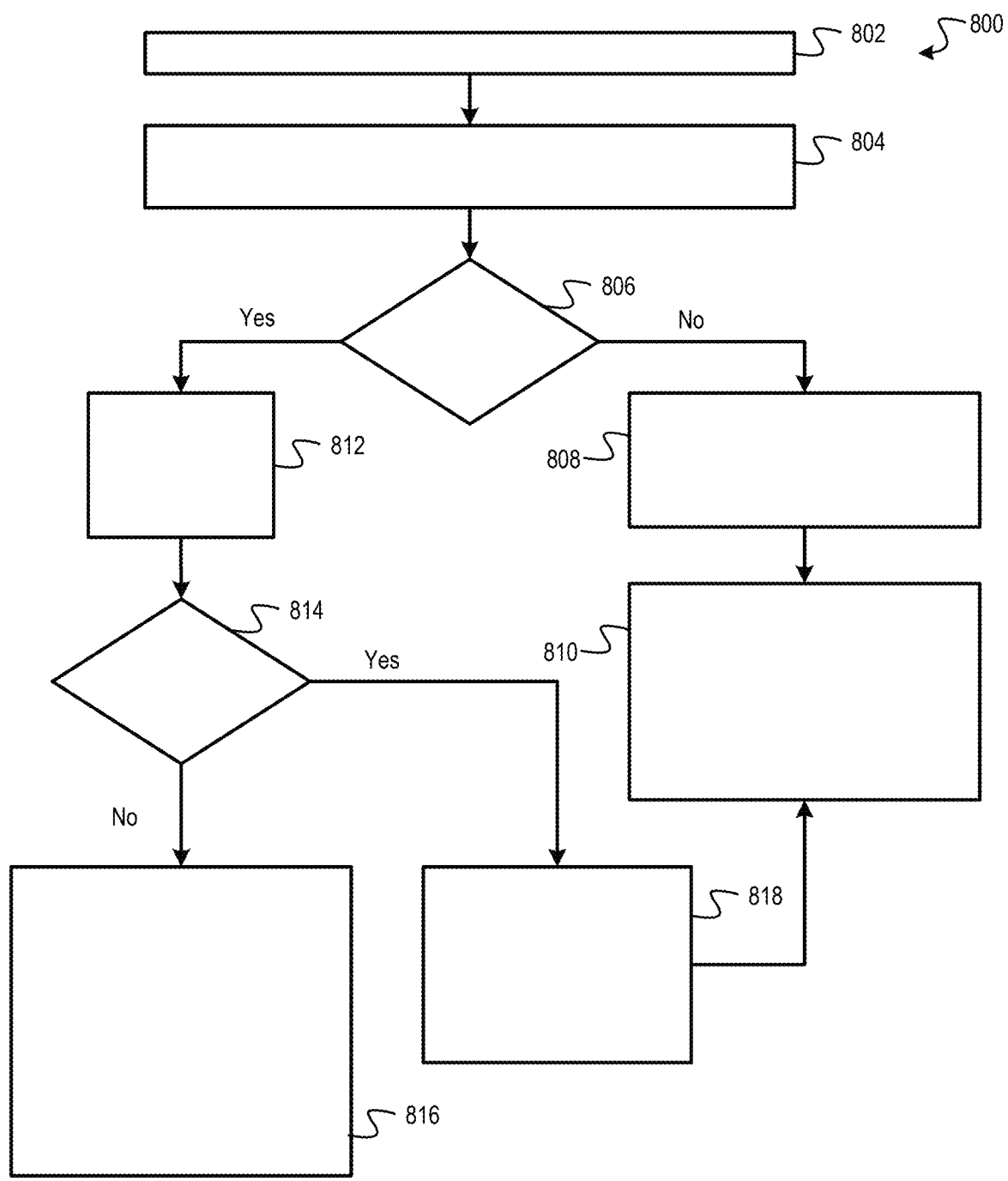
FIG. 8 is a flowchart representation of another exemplary method of dynamically dimming a set of displays sharing a single energy source in accordance with at least one embodiment.

Referring to FIG. 8, a flowchart representation of another exemplary method 800 of dynamically dimming a set of displays sharing a single energy source in accordance with at least one embodiment is shown. The method 800 will be described with reference to an exemplary implementation of an embodiment of a system for dynamic dimming of a set of displays sharing a single energy source 100. As can be appreciated in light of the disclosure, the order of operation within the method 800 is not limited to the sequential execution as illustrated in FIG. 8 but may be performed in one or more varying orders as applicable and in accordance with the present disclosure.

At 802, an eye gaze is locked. At 804, the system for dynamic dimming of a set of displays sharing a single energy source 100 determines an eye gaze zone of the driver based on eye gaze data from the gaze tracking system 204. The determined eye gaze zone is one of a front zone (on the road), a left zone, a right zone, and an undefined zone.

At 806, the system for dynamic dimming of a set of displays sharing a single energy source 100 determines whether the eye gaze of the driver is on the road based on the determined eye gaze zone. If the system for dynamic dimming of a set of displays sharing a single energy source 100 determines that the eye gaze of the driver is not on the road, the system for dynamic dimming of a set of displays sharing a single energy source 100 engages in the following actions: update the power mode zone, information: interior attention, and interface to act as a wakeup event at 808. At 810, the system for dynamic dimming of a set of displays sharing a single energy source 100 returns passenger display to normal operating mode, passenger door switches to regular pooling rate, and passenger side modules exit from pseudo sleep. If the system for dynamic dimming of a set of displays sharing a single energy source 100 determines that the eye gaze of the driver is on the road, the system for dynamic dimming of a set of displays sharing a single energy source 100 engages in the following actions: updates power mode zone and information: road attention at 812.

At 814, the system for dynamic dimming of a set of displays sharing a single energy source 100 determines if a passenger is detected. If the system for dynamic dimming of a set of displays sharing a single energy source 100 determines that a passenger is not detected, the system for dynamic dimming of a set of displays sharing a single energy source 100 engages in the following actions: passenger displays can change its power mode, low refresh rate and lower resolution, passenger door switches change pooling rate, passenger side modules reduce network bandwidth and enter pseudo sleep at 816.

If the system for dynamic dimming of a set of displays sharing a single energy source 100 determines that a passenger is detected, the system for dynamic dimming of a set of displays sharing a single energy source 100 engages in the following actions: update power mode zone, information: interior attention by passenger, and interface to act as a wakeup event. The method 800 then proceeds to 810.

In at least one embodiment, the zones may be used for other purposes, such as for example, changing the pooling rate. Such zones would be used to reduce the level of detail or resolution in the peripheral areas that are not in focus in order to optimize the utilization of the CPU and the GPU by prioritizing rendering quality where it matters most. The detection of a front passenger can be used as refining criterial for front passenger infotainment (FPI).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for dynamic dimming of a set of displays sharing a single energy source comprises:
    at least one processor; and
    at least one memory communicatively coupled to the at least one processor, the at least one memory comprising instructions that upon execution by the at least one processor, cause the at least one processor to:
        receive image data from at least one external camera of a vehicle;
        upon a determination that the image data includes an external light source:
        determine a light intensity level of the external light source based on the image data; and
        determine a light angle of the external light source with respect to the vehicle based on the image data;
        generate a desired brightness level based on the light intensity level and the light angle;
        receive driver gaze data from a gaze tracking system of the vehicle;
        determine a driver gaze direction based on the driver gaze data;
        determine whether a first display of a plurality of displays of the vehicle is in a line of sight of the driver gaze direction; and
        issue a first command to adjust a brightness level of the first display to the desired brightness level and dim the other displays of the plurality of displays to a dim brightness level, the desired brightness level being greater than the dim brightness level.

2. The system of claim 1, wherein:
    the plurality of displays are associated with a default brightness level;
    the desired brightness level is greater than the default brightness level; and
    the dim brightness level is less than the default brightness level.

3. The system of claim 1, wherein the at least one memory further comprises instructions that upon execution by the at least one processor, cause the at least one processor to:
    receive ambient light data from at least one ambient light sensor of the vehicle;
    determine whether the ambient light data is greater than a first ambient light threshold;
    upon a determination that the ambient light data is greater than the first ambient light threshold, issue a second command to adjust a hue of the first display to a day mode hue; and
    upon a determination that the ambient light data is less than the first ambient light threshold, issue the second command to adjust the hue of the first display to a night mode hue.

4. The system of claim 3, wherein the at least one memory further comprises instructions that upon execution by the at least one processor, cause the at least one processor to:
    determine whether the ambient light data is less than a second ambient light threshold, the second ambient light threshold being lower than the first ambient light threshold; and
    issue the second command to adjust the hue of the first display to a shifted night mode hue based on the determination.

5. The system of claim 3, wherein the at least one memory further comprises instructions that upon execution by the at least one processor, cause the at least one processor to:
    receive a driver eyesight profile; and
    modify at least one of the day mode hue and the night mode hue based on the driver eyesight profile.

6. The system of claim 1, wherein the at least one memory further comprises instructions that upon execution by the at least one processor, cause the at least one processor to upon a determination that none of the plurality of displays are in the line of sight of the driver gaze direction, issue a third command to adjust a brightness level of each of the plurality of displays to the dim brightness level.

7. The system of claim 1, wherein the at least one memory further comprises instructions that upon execution by the at least one processor, cause the at least one processor to upon a determination that the driver gaze direction cannot be determined based on the gaze data, issue a fourth command to adjust a brightness level of each of the plurality of displays to a default brightness level.

8. The system of claim 1, wherein the at least one memory further comprises instructions that upon execution by the at least one processor, cause the at least one processor to:
    determine whether the vehicle is on; and
    activate operation of the system for dynamic dimming of the set of displays sharing the single energy source based on the determination.

9. The system of claim 1, wherein the at least one memory further comprises instructions that upon execution by the at least one processor, cause the at least one processor to:
    receive a state of charge (SOC) value of a battery system of the vehicle;
    determine whether the SOC value is below a SOC threshold; and activate operation of the system for dynamic dimming of the set of displays sharing the single energy source based on the determination.

10. The system of claim 1, wherein the at least one memory further comprises instructions that upon execution by the at least one processor, cause the at least one processor to:
identify a light source type of the external light source based on the light intensity level and the light angle; and
generate the desired brightness level based on the light source type of the external light source.

11. The system of claim 1, wherein the external light source is one of a sun, headlights of a vehicle, a streetlight, and a billboard.

12. A method of dynamically dimming a set of displays sharing a single energy source comprising:
receiving image data from at least one external camera of a vehicle; and
upon a determination that the image data includes an external light source:
determining a light intensity level of the external light source based on the image data;
determining a light angle of the external light source with respect to the vehicle based on the image data;
generating a desired brightness level based on the light intensity level and the light angle;
receiving driver gaze data from a gaze tracking system of the vehicle;
determining a driver gaze direction based on the driver gaze data;
determining whether a first display of a plurality of displays of the vehicle is in a line of sight of the driver gaze direction; and
issuing a first command to adjust a brightness level of the first display to the desired brightness level and dim the other displays of the plurality of displays to a dim brightness level, the desired brightness level being greater than the dim brightness level.

13. The method of claim 12, wherein:
the plurality of displays are associated with a default brightness level;
the desired brightness level is greater than the default brightness level; and
the dim brightness level is less than the default brightness level.

14. The method of claim 12 further comprising:
receiving ambient light data from at least one ambient light sensor of the vehicle;
determining whether the ambient light data is greater than a first ambient light threshold;
upon a determination that the ambient light data is greater than the first ambient light threshold, issuing a second command to adjust a hue of the first display to a day mode hue; and
upon a determination that the ambient light data is less than the first ambient light threshold, issuing the second command to adjust the hue of the first display to a night mode hue.

15. The method of claim 14, further comprising:
determining whether the ambient light data is less than a second ambient light threshold, the second ambient light threshold being lower than the first ambient light threshold; and
issuing the second command to adjust the hue of the first display to a shifted night mode hue based on the determination.

16. The method of claim 12, further comprising upon a determination that none of the plurality of displays are in the line of sight of the driver gaze direction, issuing a third command to adjust a brightness level of each of the plurality of displays to the dim brightness level.

17. The method of claim 12, further comprising upon a determination that the driver gaze direction cannot be determined based on the gaze data, issuing a fourth command to adjust a brightness level of each of the plurality of displays to the default brightness level.

18. The method of claim 12, further comprising:
identifying a light source type of the external light source based on the light intensity level and the light angle; and
generating the desired brightness level based on the light source type of the external light source.

19. The method of claim 12, further comprising:
locking a driver eye gaze;
determining an eye gaze zone, the eye gaze zone being one of a front zone, a left zone, a right zone, and undefined zone, the front zone being associated with road attention; and
determining whether the eye gaze is on a road based on the determined eye gaze zone;
upon a determination that the eye gaze is on the road; and
update a power mode zone;
update information to the road attention; and
determine whether a passenger is detected;
upon a determination that the passenger is detected:
update the power mode zone;
update the information to interior attention by the passenger and an interface to act as a wakeup event;
place passenger displays in a normal operating mode;
place passenger door switches in a regular pooling rate; and
exit passenger side modules from a pseudo sleep; and
upon a determination that the passenger is not detected:
passenger displays are able to change power modes, lower refresh rate, and lower resolution;
change the pooling rate of the passenger door switches;
reduce a network bandwidth of the passenger side modules; and
enter the passenger side modules into the pseudo sleep; and
upon a determination that the eye gaze is not on the road:
update the power mode zone; and
update the information to interior attention;
place the passenger displays in the normal operating mode;
place the passenger door switches in the regular pooling rate; and
exit the passenger side modules from the pseudo sleep.

20. A vehicle including a system for dynamic dimming of a set of displays sharing a single energy source comprises:
at least one external camera;
at least one processor communicatively coupled to the at least one external camera; and
at least one memory communicatively coupled to the at least one processor, the at least one memory comprising instructions that upon execution by the at least one processor, cause the at least one processor to:

receive image data from the at least one external camera;
upon a determination that the image data includes an external light source:
  determine a light intensity level of the external light source based on the image data; and
  determine a light angle of the external light source with respect to the vehicle based on the image data;
  generate a desired brightness level based on the light intensity level and the light angle;
  receive driver gaze data from a gaze tracking system of the vehicle;
  determine a driver gaze direction based on the driver gaze data;
  determine whether a first display of a plurality of displays of the vehicle is in a line of sight of the driver gaze direction; and
  issue a first command to adjust a brightness level of the first display to the desired brightness level and dim the other displays of the plurality of displays to a dim brightness level, the desired brightness level being greater than the dim brightness level.

\* \* \* \* \*